United States Patent
Milanowski et al.

(12) 
(10) Patent No.: US 6,184,467 B1
(45) Date of Patent: Feb. 6, 2001

(54) SEALED BOX FOR TAPPING A CABLE

(75) Inventors: Michel Milanowski, Anserville; Alain Lepeuve, Noisy Le Roi; Alain Vincent, Juilly, all of (FR)

(73) Assignee: Alcatel, Paris (FR)

( * ) Notice: Under 35 U.S.C. 154(b), the term of this patent shall be extended for 0 days.

(21) Appl. No.: 09/261,176

(22) Filed: Mar. 3, 1999

(30) Foreign Application Priority Data

Mar. 9, 1998 (FR) .................................................. 98 02821

(51) Int. Cl.$^7$ ...................................................... H02G 3/18
(52) U.S. Cl. ................... 174/65 G; 174/152 G; 16/2.1; 248/56
(58) Field of Search .................. 174/65 G, 65 R, 174/152 G, 153 G, 65 SS, 31 R, 35 GC, 151, 135; 16/2.1, 2.2; 248/56; 439/471

(56) References Cited

U.S. PATENT DOCUMENTS

| | | | |
|---|---|---|---|
| 1,800,578 | * | 4/1931 | Webb ....................................... 403/50 |
| 2,396,836 | * | 3/1946 | Ellmwood ............................. 174/135 |
| 3,206,539 | * | 9/1965 | Kelly ..................................... 174/68.3 |
| 3,229,026 | * | 1/1966 | Sulzer ................................. 174/153 G |
| 3,634,608 | * | 1/1972 | Buhl ................................... 174/153 G |
| 4,272,645 | * | 6/1981 | Kornatowski ....................... 174/65 G |
| 5,210,374 | | 5/1993 | Channell . |
| 5,216,206 | * | 6/1993 | Maesako ............................ 174/153 G |
| 5,235,134 | | 8/1993 | Jaycox . |
| 5,254,808 | * | 10/1993 | Rodrigues et al. ................. 174/65 R |
| 5,343,669 | * | 9/1994 | Petri ..................................... 52/716.8 |
| 5,422,436 | * | 6/1995 | Zachrai .............................. 174/65 G |
| 5,510,576 | | 4/1996 | Tenace et al. . |
| 5,675,124 | * | 10/1997 | Stough et al. ....................... 174/65 G |
| 5,726,392 | * | 3/1998 | Fam et al. ........................... 174/65 G |
| 5,834,693 | * | 11/1998 | Waddell et al. .................... 174/65 R |

FOREIGN PATENT DOCUMENTS 43 33 067 C1    3/1995   (DE) .
0 767 522 A1    4/1997   (EP) .

* cited by examiner

Primary Examiner—Kristine Kincaid
Assistant Examiner—Dhiru R Patel
(74) Attorney, Agent, or Firm—Sughrue, Mion, Zinn, Macpeak & Seas, PLLC

(57) ABSTRACT

A sealed tapping box provided with an access for a loop of a cable folded over to form a U-loop and penetrating into the box via an opening provided in a wall. The opening is elongate, is edged by a seat for receiving a gasket, and is surrounded at each of its ends by a respective external neck which is carried by the box and which is laterally split facing the opening. A gasket includes a strip for closing off the opening and two tubular stoppers projecting from the ends of the strip. Each of these stoppers plugs a respective neck, and is provided with a respective through duct to enable cable to pass through. A compression device fixes to the box and includes first auxiliary seal for pressing the strip against the gasket seat, and second auxiliary seal for pressing the stoppers into the necks and a onto the cable that passes through them.

9 Claims, 3 Drawing Sheets

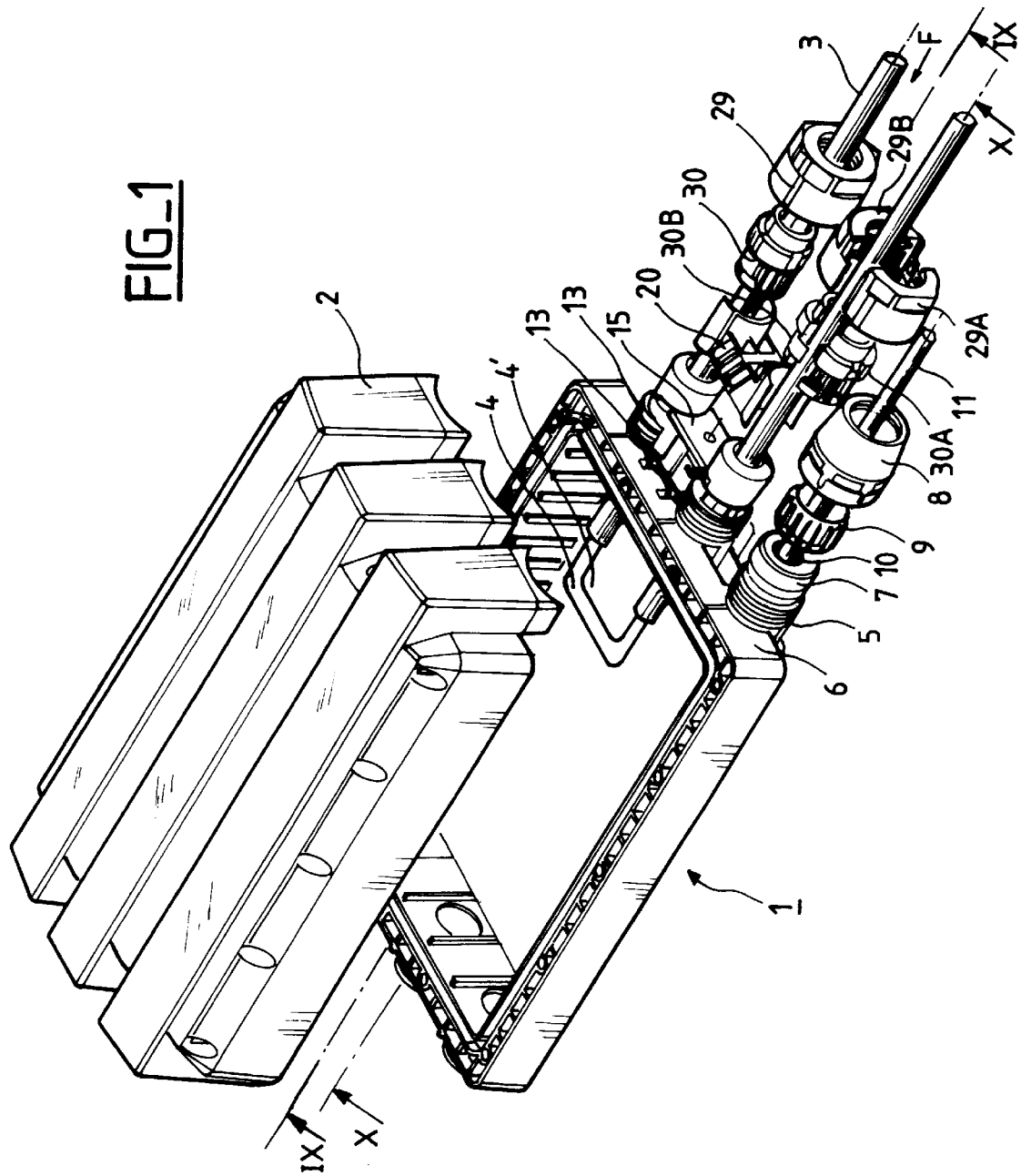
FIG_1

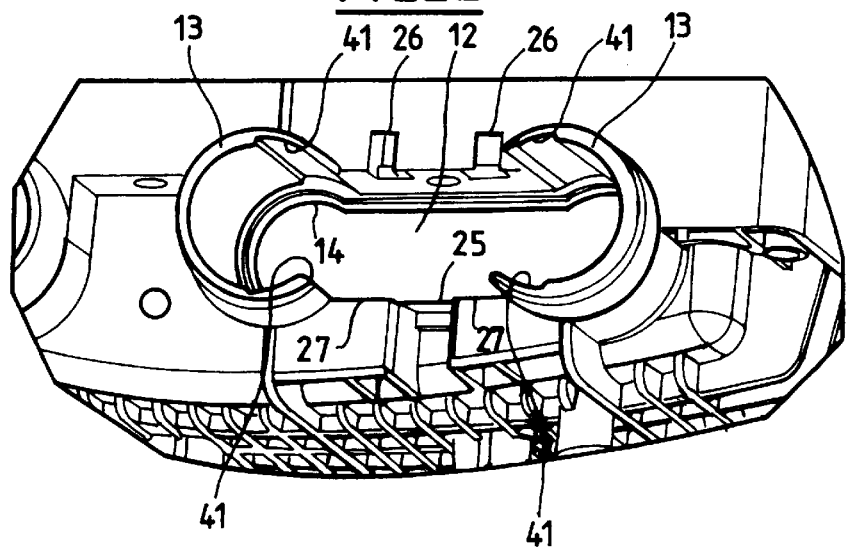
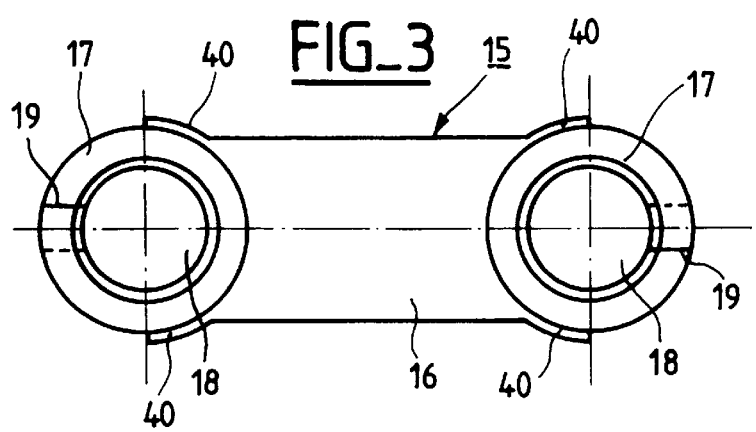
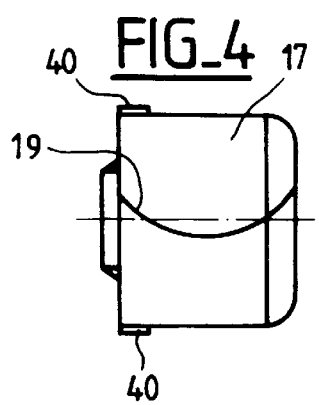
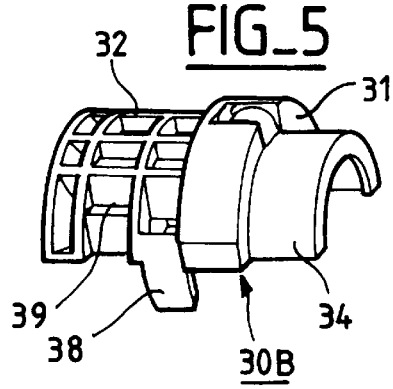
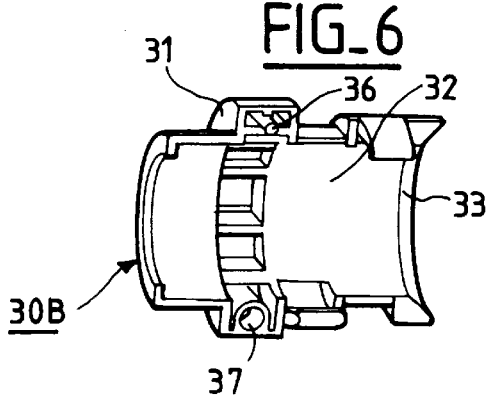

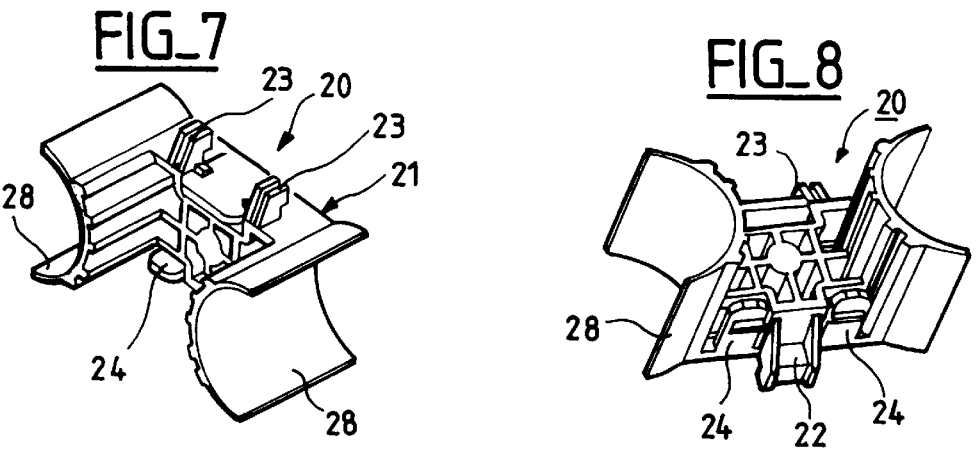
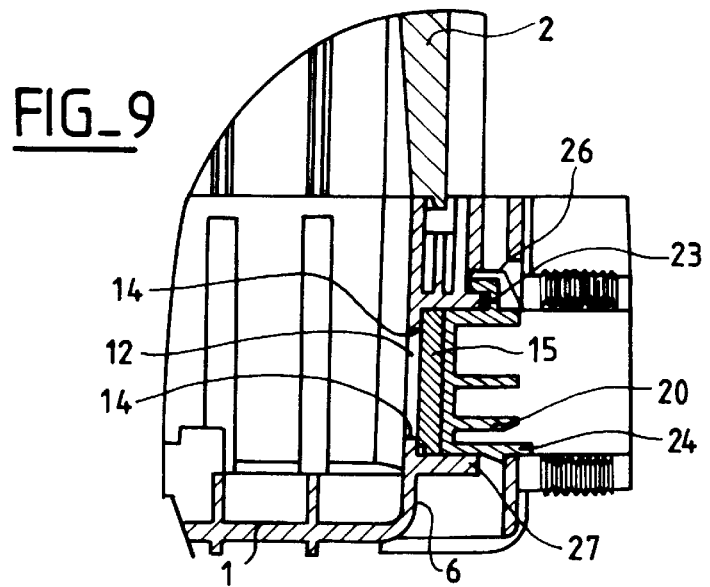
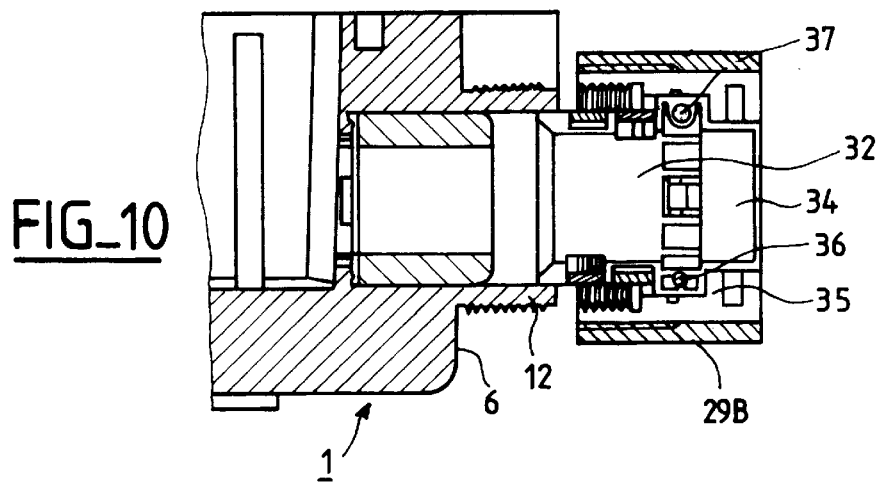

SEALED BOX FOR TAPPING A CABLE

The invention relates to a sealed box for tapping a cable, the box being designed to be suitable for being mounted in any position along the cable, as a function of requirements.

BACKGROUND OF THE INVENTION

Boxes containing the means necessary for connecting cables to equipment and disposed in determined positions along such cables are conventionally designed to be sealed, in particular when they are to be mounted outdoors or underground. It is advantageous to preserve, as much as possible, continuity of the electrical and/or optical conductors of a cable on which tapping is performed for connecting equipment. Sealed boxes have therefore been developed that enable a cable to pass through them via two openings provided in two different walls of the same box, or, alternatively, that enable a cable folded over to form a U-loop to pass through a single opening.

In a box designed to enable a cable to pass through it, the two openings required for the cable to pass through the box are generally situated at a join zone between two dissociable portions of the box, e.g. in the form of recesses opening out into the zone on which a lid bears against a box shell.

It is then possible to insert a cable transversely into the recesses, without it being necessary to thread one end of the cable through an orifice, which is unacceptable whenever there is a long length of cable to be threaded.

Implementing a sealed box provided with a cable passageway opening out into a join zone between the box portions involves implementing means for providing sealing in the zone in which the cable meets the two box portions.

As is known, it is difficult to obtain and to sustain sealing of that type, referred to as three-point sealing, between the elements constituted by a cable and by two touching box portions because of the necessary co-operation between elements, e.g. by alignment, in particular if the box is re-opened subsequently.

Document U.S. Pat. No. 5,235,134 describes a box enabling a cable folded over to form a U-loop to pass into it such that the two cable portions situated on either side of the fold come out side-by-side from the same side of the box. A hollow tubular body makes it possible for the U-looped cable to pass through, and its base is closed off by a sealing gasket provided with individual through holes for the two portions of the folded-over cable and for branch cables. The gasket is compressed against the tubular body and against the cables by means of a compression assembly formed of two portions clamped firstly against each other and secondly against the body by means of screws. The top of the tubular body receives a cylindrical cap mounted in sealed manner over the U-loop of the cable, and over the branches established at that level. That box, which is circular or oval in section has the characteristic of making provision to pass all of the cables, looped or non-looped, via individual holes in a common circular or oval gasket whose dimensions must remain small for physical reasons. Such a box can therefore be unsuitable when the looped cable is an optical cable which has a minimum radius of curvature that is quite large. In addition, by design, that type of box is ill-suited to receiving equipment modules such as, for example, optical tapping modules or cassettes that can be advantageously incorporated.

OBJECTS AND SUMMARY OF THE INVENTION

The invention therefore provides a sealed tapping box provided with at least one opening provided in a wall for the purpose of inserting a loop of a cable folded over to form a U-loop into the box.

According to a characteristic of the invention, the box is provided with an elongate insertion opening edged by a seat for receiving a gasket and surrounded at each of its ends by a respective external neck which is carried by the box and which is laterally split facing the opening so as to receive a portion of the cable inserted through said opening, a gasket comprising a strip for closing off the opening and two tubular stoppers projecting from the ends of the strip and provided with respective through ducts to enable respective ones of the portions of the cable to pass into the box in sealed manner from the outside through the necks that are plugged by the stoppers, and a compression device which fixes to the box and which comprises first auxiliary sealing means for pressing the strip against the gasket seat, and second auxiliary sealing means for pressing the stoppers into the necks and onto the cable portions that pass through them.

BRIEF DESCRIPTION OF THE DRAWINGS

The invention, its characteristics, and its advantages are described in more detail in the following description given with reference to the figures, in which:

FIG. 1 is an exploded perspective view of a box of the invention and more particularly of an access of the box for a U-looped cable;

FIG. 2 shows a detailed view looking along arrow F of a portion relating to an access for a U-looped cable of the box shown in FIG. 1;

FIGS. 3 and 4 are respectively a front view and a right view of a gasket for a U-looped cable access of the invention;

FIGS. 5 and 6 are respectively an external view and an internal view of a presser half-socket in respective significant angular positions;

FIGS. 7 and 8 are respective views of a gasket presser in respective significant angular positions; and FIGS. 9 and 10 are section views respectively on IX—IX and on X—X of a box end at a U-looped cable access.

MORE DETAILED DESCRIPTION

The sealed box including a body 1, of the shell type, closed by a lid 2, that is shown in FIG. 1 is, for example, made of a molded and rigid thermoplastic material. In this example, it is assumed to be a tapping box that can be mounted in any position, chosen as a function of needs, along a cable 3, and more particularly a telecommunications cable including a plurality of electrical conductor wires and/or of optical fibers for serving communications equipment. The box 1 is assumed to be provided with at least one access enabling a loop obtained by folding over a cable 3 to form a U-loop to be inserted into the box.

When the box is a tapping box, the cable 3 is partially stripped of the covering surrounding it so as to break out the wires, fibers or fiber-containing tubes that it contains, in the cable portion constituting the loop, so as to enable them to be connected to equipment-serving wires or fibers that are not shown insofar as they not the subject of the present invention. The box of the invention may be provided with other cable accesses, as shown in FIG. 1 which shows a conventional access enabling a cable portion to pass through via a neck 5 provided around an orifice provided in a wall 6 of the box. The neck is assumed to be organized to receive internally a cable gasket 7 of cylindrical appearance, and to receive externally a compression nut 8 which screws onto the neck The nut pushes the cable gasket 7 via a compression socket 9 into the neck and against a cable 11 inserted in a longitudinal cable-passing duct 10 provided in the gasket 7. For example, the cable 11 may be a branch cable including electrical wires or optical fibers connected to wires or to fibers of the cable 3 at the looped portion of the cable which is stripped of its covering and which is positioned inside the box.

The loop formed by folding over the cable 3 to form a U-loop is intended to be inserted into the box via a single opening 12, assumed in this example to be provided in a wall 6 of the box as shown in FIG. 2. The opening 12 is preferably chosen to be elongate so as to enable a cable loop 3 to be inserted that is relatively wide, in particular when the cable includes optical fibers for which a relatively large radius of curvature is recommended.

In the embodiment proposed, each of the ends of the opening 12 provided in the wall 6 is surrounded by a neck 13 which projects outwardly from the box from this wall, and which is longitudinally split facing the opening so as to allow a cable 3 to pass through. The opening 12 itself is peripherally edged by a seat 14 provided to receive the edge of a gasket. In the embodiment shown in FIG. 2, the seat is assumed to extend in uninterrupted manner around the opening 12 which has a rectangular central portion terminating in circular manner inside each neck 13. It is thus possible to insert a cable loop 3 into the box via the opening 12 and to position respective ones of the two cable portions that extend the loop on either side of the U-shaped fold in the necks 13 that flank the opening. These two portions then project side-by-side from the necks 13 when the loop is inside the box.

The cable access provided at the opening 12 is sealed by implementing a sealing gasket 15, e.g. made of silicone, and, in this example, comprising a strip 16 for closing off the opening 12 and two stoppers 17 for closing off the necks 13.

Once the cable loop has been inserted into the box via the opening 12, the strip 16 is pressed against the seat 14 which edges said opening 12, and it optionally rests on a plane partition positioned inside the box between the cable portions and against the wall in which the opening 12 is provided, the plane partition not being shown.

The two stoppers 17 project at the ends of the strip 16 so as to penetrate into respective ones of the necks when the gasket 15 is in place with its strip pressed against the seat that edges the opening 12.

Each stopper is tubular and is provided with a longitudinal through duct 18 through which a cable portion 3 can pass in sealed manner. Each duct 18, assumed to be central in this example, is provided with a side slot 19 whose edges can be parted so as to enable a cable portion 3 to be inserted transversely into the duct. In this example, this slot is assumed to be situated on the other side of the duct from the strip 16, for each stopper.

Inserting a cable loop 3 into the box then involves putting in place the two portions that extend beyond the loop in respective ones of the stoppers 17 of the gasket prior to inserting the loop into the opening 12, and prior to inserting the stoppers into the necks 13 until the strip 16 abuts against the seat 14 edging the opening 12.

The opening 12 is then plugged by the gasket 15 whose stoppers also plug the necks, the sealing of the plugging being completed by implementing a compression device that screws onto the box.

In an embodiment, the interfaces between the strip 16 and the stoppers 17 are supplemented by side edges 40 which extend from each end of the strip at the bottoms of the stoppers and on either side of each stopper, and which terminate at the same level corresponding to the middle of each stopper. These edges co-operate with longitudinal recesses 41 provided in the necks for positioning the gasket relative to the box, and more particularly for positioning the stoppers relative to the necks, and for positioning the strip relative to the opening 12.

The compression device includes first auxiliary sealing means for pressing the strip 16 against the seat 14. The pressing is obtained by the action of a rigid auxiliary part 20 shown in detail in FIGS. 7 and 8. This auxiliary part has an abutment face 21 via which it presses against the strip 16 of the gasket between the stoppers 17, so as to press the edge of the strip against the seat 14.

In the embodiment shown, the auxiliary part 20 is held stationary on the box on either side of the opening 12 by means of positioning and/or fastening members 22, 23, 24 co-operating, in particular by snap-fastening, with complementary means 25, 26, 27 provided around the opening 12 in the wall 6. The auxiliary part thus presses the gasket 15 with the desired pressure against the gasket seat 14 edging the opening 12, as shown in FIG. 9.

The compression device also includes second auxiliary sealing means for pressing the stoppers into the necks and onto the cable portions that pass through them.

In a preferred embodiment of the invention, the auxiliary part 20 co-operates with the second auxiliary means and is provided with side extensions 28 serving to close off the slots provided in the necks for passing the cable 3, and to complete the inside wall of the cylindrical cavity defined by each of the necks for the stopper that it receives. Each of the side extensions 28 is assumed, in this example, to be semi-circular, and includes a curved gasket abutment zone having a concave face facing towards the longitudinal axis of the neck along the slot of which the extension is positioned by sliding when the auxiliary part including it is pushed towards the box wall 6 against which the part is pressed at the edge of the stopper on the gasket strip.

The second auxiliary sealing means essentially comprise two nuts 29, each of which screws onto a respective one of the necks 13 whose ends are threaded for this purpose, and two compression sockets 30. The compression sockets serve to transmit the pressure caused by tightening the nuts to the stoppers 17.

In a preferred embodiment, each nut 29 is made up of an assembly of two complementary semi-tubular portions 29A and 29B which are secured together, e.g. by means of snap-fastening, after a cable 3 has been inserted through them. Each of the compression sockets 30 is also preferably made up of two complementary semi-tubular portions 30A and 30B which, in this example, are of identical construction, and which are secured together, e.g. by snap-fastening, after the cable 3 has been inserted through them.

Each of the two complementary portions of a socket 30 is provided, in this example, with a peripheral half-rib 31 forming an abutment for a nut and positioned between one half of a cylindrical presser element 32 having a frustoconical end 33 for abutting against an end of a stopper 17, and one half of an end cylinder 34. A circular abutment 35 provided inside each nut makes it possible for the nut to press against the peripheral rib 31 going towards the box, when the nut is screwed on a neck (see FIG. 10).

In the embodiment shown, the semi-tubular portions are coupled together accurately and permanently by means of complementary positioning members, such as the centering stud 36 and the centering duct 37 shown in FIGS. 6 and 10, provided in complementary manner on the semi-tubular portions. The coupling is made permanent by the tabs 38 carried by each of the portions co-operating with complementary notches 39 in which the catches are snap-fastened when the portions are coupled together. In the embodiment shown, the semi-tubular portions are hollowed out and perforated to save material, as shown in FIG. 5.

As indicated above, the assembly made up by a nut 29 and by a socket 30 is positioned relative to a neck 13 onto which the nut is screwed, after the two semi-tubular socket portions 29A, 29B and the two semi-tubular nut portions 30A, 30B have been respectively coupled together around the cable portion 3 that passes through the neck 13, and after the socket has been inserted into the nut. Prior to this, one of the stoppers 17 of a gasket 15 is mounted on the cable portion so that the cable portion is received in the duct 18 of the stopper, after having passed between the edges of the insertion slot 19 at the edge of the duct. The same operation is performed for the other stopper of the gasket 15 on the cable portion situated on the other side of the U-shaped fold in the cable 3, and the gasket 15 is positioned against the wall 6 of the box in abutment against the seat 14, the loop formed by the folded-over cable having been previously inserted through the opening 12. Screwing a nut on a neck inside which a stopper mounted on a cable portion has been positioned as indicated above causes the circular abutment 35 of the nut to press against the peripheral rib 31 on the socket on which it is placed, and causes the socket to be pushed against the end of the stopper. The end of the stopper 17 is preferably shaped to be complementary to the circular abutment 33 in the socket, as shown in FIG. 4, the abutment and the end having, for example, complementary profiles that are curved or frustoconical for concentrating the pressure.

Each of the two stoppers mounted in this way is compressed against the inside wall of the neck in which it is situated, and against the cable portion that it receives. In a preferred embodiment of the invention, the cable insertion slot 19 in a stopper, which slot extends along one side of the stopper, is a curved side slot whose edges are self-centering relative to each other, so as to center and maintain naturally aligned the two portions of the gasket separated by the slot. The two edges of an insertion slot are, in this example, defined by the same curve, e.g. the same circular arc, whose center is situated in a transverse midplane of the stopper. The gasket then positions itself optimally in the neck, without the fitter assigned to the task of mounting it needing to take any special precaution.

What is claimed is:

1. A sealed tapping box comprising at least one opening provided in a wall for the purpose of inserting a loop of a cable folded over to form a U-loop into the box, said opening being edged by a gasket seat for receiving a gasket and surrounded at each of its ends by external necks which are carried by the box and which are laterally split facing the opening so as to receive a portion of the cable inserted through said opening, said gasket comprising a strip for closing off the opening and two tubular stoppers projecting from the ends of the strip and provided with respective through ducts to enable the portion of the cable to pass into the box in sealed manner from the outside through the necks that are plugged by the stoppers, and a compression device which fixes to the box and which comprises first auxiliary sealing means for pressing the strip against the gasket seat, and second auxiliary sealing means for pressing the stoppers into the necks and onto the cable portion that passes through them.

2. A box according to claim 1, wherein each of the stoppers of the gasket is provided with a cable duct provided with a side slot having edges which center the gasket.

3. A box according to claim 1, wherein each of said stoppers is provided with a side slot that has centering edges and that is curved.

4. A box according to claim 1, wherein an interface between the strip and the stoppers is supplemented by side edges which extend from each end of the strip on either side of each of the stoppers, and which co-operate with recesses provided in the necks to position the gasket relative to the box.

5. A box according to claim 1, wherein the first auxiliary means implement a rigid auxiliary sealing part which is shaped to fix onto the box facing the opening, thereby pressing the gasket strip against the gasket seat.

6. A box according to claim 5, wherein the auxiliary part is fixed to the box by means of complementary positioning members.

7. A box according to claim 1, wherein the second auxiliary sealing means comprise two nuts, each of the nuts being made up of an assembly of complementary semi-tubular portions which screw onto respective ones of the necks, so that each of the nuts compresses a respective one of said stoppers in a respective one of said necks onto the cable via a compression socket also made up of an assembly of semi-tubular portions defining a passageway for the cable.

8. A box according to claim 1, wherein a rigid auxiliary part with which the first auxiliary sealing means are provided is organized to co-operate with the second auxiliary sealing means, and it carries side extensions that slide to close off respective ones of the slots in the necks which are completed by the side extensions.

9. A box according to claim 8, wherein the side extensions on the auxiliary part are semi-circular, and each of them has a curved gasket-abutment zone that presses at the edge of said stoppers against the gasket strip.

* * * * *